United States Patent Office.

RENÉ BOHN, OF LUDWIGSHAFEN-ON-THE-RHINE, BAVARIA, GERMANY, ASSIGNOR TO THE BADISCHE ANILIN & SODA FABRIK, OF MANNHEIM, GERMANY.

TRIOXYBENZOPHENONE.

SPECIFICATION forming part of Letters Patent No. 415,088, dated November 12, 1889.

Application filed August 31, 1889. Serial No. 322,611. (No specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Trioxybenzophenone, of which the following is a specification.

My invention relates to the manufacture of an improved dye-stuff or coloring-matter, which, according to its chemical constitution, is termed "trioxybenzophenone," and which is provided by the condensation of equal molecules of pyrogallol and of benzoic acid.

In carrying out my invention about ten parts, by weight, of pyrogallol and about ten parts, by weight, of benzoic acid are introduced into an enameled cast-iron vessel provided with an agitator and fitted up in an oil bath. The temperature is then gradually raised to about 140° centigrade and for the liquefied mixture thus obtained about thirty parts, by weight, of powdered chloride of zinc are added in small portions at a time and under constant agitation. The said temperature is then maintained for about three hours, or until no laminæ of benzoic acid separate out, when a sample of the melt thus produced is dissolved in hot water and subsequently cooled, and a deposit of slender light-yellow-colored needles, characteristic of the desired trioxybenzophenone, is formed. This point being arrived at, the result of the operation is dissolved in about six hundred parts, by weight, of boiling water, (by preference with the addition of some animal charcoal, whereby a purification is effected,) and the solution is filtered and allowed to cool down, when the trioxybenzophenone thus produced separates out in the state of its above-mentioned needle-shaped crystals, and may then be collected upon a filter, washed and dried, or, by preference, be supplied to dyers and printers in the mercantile condition of a paste or pulp.

Trioxybenzophenone, prepared as hereinbefore described, corresponds in its dry state to the formula: $C_6H_5—CO—C_6H_2(OH)_3$. It is easily soluble in alcohol, sulphuric ether, acetone, or glacial acetic acid, dissolves but sparingly in cold water and more readily in boiling water. The above-named needle-shaped crystals, which are deposited from its boiling aqueous solution upon cooling, contain one molecule of water, and fuse at 137° and 138° centigrade. Upon treatment with acetic anhydride a triacetyl compound is formed, crystallizing in colorless plates and fusing at 119° centigrade. Trioxybenzophenone dissolves both in alkaline liquors and in concentrated sulphuric acid with an intense yellow color. If dissolved in an excess of caustic potash or soda liquor, its alkaline solutions readily absorb oxygen from the atmospheric air under formation of a green-colored oxidation product.

My new coloring-matter is not capable of dyeing either animal or vegetable fibers without the aid of a mordant; but it combines with metallic oxides or mordants in a manner similar to alizarine colors, and may thus be employed in order to produce a variety of fast and useful shades in dyeing and printing, ranging from a bright yellow to different shades of brown, according to the mordant employed. Thus, for instance, alumina mordants produce yellow colors, which are brightened by the joint application of a tin mordant, while iron mordants develop an olive-brown shade and chrome mordants yield yellowish-brown colors.

What I claim as new, and desire to secure by Letters Patent, is—

As a new product, the hereinbefore-described trioxybenzophenone, produced by the condensation of pyrogallol and benzoic acid, and which is characterized by the following properties: It crystallizes from its boiling aqueous solution upon cooling in long slender needles, fusing at 137° to 138° centigrade, hardly soluble in cold water, but easily soluble in alcohol, and dissolving both in concentrated sulphuric acid and in alkaline liquors with an intense yellow color, the alkaline solutions, which contain an excess of a fixed caustic alkali, rapidly absorbing oxygen from the atmospheric air under production of a green-colored compound, and it combines with metallic mordants in dyeing and printing, thus producing with alumina a fast yellow color, and with iron and chrome mordants brown shades.

In testimony whereof I have hereunto set my hand in the presence of two subscribing witnesses.

RENÉ BOHN.

Witnesses:
ERNEST F. EHRHARDT,
OSCAR BALLY.